(12) United States Patent
Yamashita et al.

(10) Patent No.: US 10,094,263 B2
(45) Date of Patent: Oct. 9, 2018

(54) INTERNAL COMBUSTION ENGINE, AND DEVICE AND METHOD FOR CONTROLLING INTERNAL COMBUSTION ENGINE

(71) Applicant: Mitsubishi Heavy Industries, Ltd., Tokyo (JP)

(72) Inventors: Yukio Yamashita, Tokyo (JP); Yoshihisa Ono, Tokyo (JP); Musashi Sakamoto, Tokyo (JP); Takeshi Tsuji, Tokyo (JP); Akihiro Miyanagi, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/323,061

(22) PCT Filed: Aug. 7, 2015

(86) PCT No.: PCT/JP2015/072570
§ 371 (c)(1),
(2) Date: Dec. 29, 2016

(87) PCT Pub. No.: WO2016/111033
PCT Pub. Date: Jul. 14, 2016

(65) Prior Publication Data
US 2017/0306824 A1 Oct. 26, 2017

(30) Foreign Application Priority Data
Jan. 9, 2015 (JP) .................................. 2015-003425

(51) Int. Cl.
*F01N 3/38* (2006.01)
*F02B 37/22* (2006.01)
(Continued)

(52) U.S. Cl.
CPC ............... *F01N 3/38* (2013.01); *F02B 37/007* (2013.01); *F02B 37/10* (2013.01); *F02B 37/14* (2013.01); *F02B 37/16* (2013.01); *F02B 37/225* (2013.01)

(58) Field of Classification Search
CPC .......... F01N 3/38; F02B 37/225; F02B 37/16; F02B 37/14; F02B 37/10; F02B 37/007
(Continued)

(56) References Cited

U.S. PATENT DOCUMENTS 8,096,125 B2 * 1/2012 Hepburn ................. F01N 3/021
60/605.2
8,141,358 B2 * 3/2012 Kolmanovsky ........... F01L 9/04
123/399
(Continued)

FOREIGN PATENT DOCUMENTS

EP 2767701 A1 8/2014
JP 2009167799 A 7/2009
(Continued)

OTHER PUBLICATIONS

Ono, et al, "Application of a Large Hybrid Turbocharger for Marine Electric-power Generation," Mitsubishi Heavy Industries Technical Review, vol. 49, No. 1, Mar. 2012, 9 Pages.
(Continued)

*Primary Examiner* — Hoang Nguyen
(74) *Attorney, Agent, or Firm* — Berkeley Law & Technology Group, LLP

(57) ABSTRACT

According to a device and a method for controlling an internal combustion engine, a control device (38) enables controllability of the internal combustion engine to be improved by preventing surging from occurring upon starting or stopping of the internal combustion engine, by opening a relief valve (28) as a turbine rotational speed reaches a surging rotational speed when the control device (38) causes a motor generator (32) to assist in rotation of the turbocharger (12) upon starting of a diesel engine body (11).

10 Claims, 8 Drawing Sheets

(51) Int. Cl.
*F02B 37/10* (2006.01)
*F02B 37/14* (2006.01)
*F02B 37/007* (2006.01)
*F02B 37/16* (2006.01)

(58) Field of Classification Search
USPC .............................................. 60/605.1, 605.2
See application file for complete search history.

(56) References Cited

U.S. PATENT DOCUMENTS

| | | | | |
|---|---|---|---|---|
| 8,141,360 | B1* | 3/2012 | Huber ...................... | B60K 6/24 |
| | | | | 290/40 B |
| 2010/0266395 | A1* | 10/2010 | Hermann ................ | F02B 37/00 |
| | | | | 415/191 |
| 2010/0300405 | A1* | 12/2010 | Uhrich ................ | F02B 29/0418 |
| | | | | 123/435 |

FOREIGN PATENT DOCUMENTS

| | | |
|---|---|---|
| JP | 2010127239 A | 6/2010 |
| JP | 2014159810 A | 9/2014 |

OTHER PUBLICATIONS

International Search Report & Written Opinion, App. No. PCT/JP2015/072570, Filed Aug. 7, 2015, dated Oct. 20, 2015, 8 Pages.
Written Opinion of the International Searching Authority, App. No. PCT/JP2015/072570, Filed Aug. 7, 2015, dated Oct. 20, 2015, 4 Pages.
Extended European Search Report, App. No. 15876906.7, dated Oct. 24, 2017, 6 Pages.

* cited by examiner

INTERNAL COMBUSTION ENGINE, AND DEVICE AND METHOD FOR CONTROLLING INTERNAL COMBUSTION ENGINE

FIELD

The present invention relates to an internal combustion engine having a turbocharger, and to a device and a method for controlling this internal combustion engine.

BACKGROUND

In Patent Literature 1, a hybrid turbocharger is disclosed, the hybrid turbocharger having: a turbine unit driven by exhaust gas guided from an internal combustion engine; a compressor unit, which is driven by the turbine unit and pressure-feeds combustion gas to the internal combustion engine; and a motor generator having a rotating shaft coupled to a rotating shaft of the turbine unit and the compressor unit. In this hybrid turbocharger, the motor generator functions as an electric motor when engine power of the internal combustion engine increases. Thus, in the internal combustion engine, temporary shortage of intake is able to be prevented from occurring.

Further, in Non-Patent Literature 1, a technique is disclosed, the technique for supplying intake to an internal combustion engine by use of an auxiliary blower when sufficient combustion gas is unable to be taken in by an internal combustion engine like upon starting of the internal combustion engine.

CITATION LIST

Patent Literature

Patent Literature 1: Japanese Laid-open Patent Application No. 2010-127239
Patent Literature 2: Japanese Laid-open Patent Application No. 2009-167799

Non-Patent Literature

Non-Patent Literature 1: Mitsubishi Heavy Industries Technical Review, Vol. 49, No. 1 (2012), New Products & Technologies, "Application of Large Marine Hybrid Turbocharger for Electric Power Generation by Exhaust Gas from Main Engine"

SUMMARY

Technical Problem

It has recently been proposed to start a compressor by causing a motor generator of the hybrid turbocharger disclosed in Patent Literature 1 to function as an electric motor and causing the internal combustion engine to perform intake, without use of an auxiliary blower. When a turbocharger is started by the electric motor, combustion gas is forcibly fed into cylinders of the internal combustion engine, but since at a time point before starting of the internal combustion engine, the compressor is unable to discharge the combustion gas pressure-fed to the cylinders from inside the cylinders of the internal combustion engine, surging may occur. Techniques for preventing the occurrence of surging include the one described in the above cited Patent Literature 2, but this technique does not consider the time of starting of the internal combustion engine.

The present invention solves the above described problems, and aims to provide an internal combustion engine, and a device and a method for controlling the internal combustion engine, which enable controllability of the internal combustion engine to be improved by preventing occurrence of surging upon starting or stopping of the internal combustion engine.

Solution to Problem

According to an aspect of the present invention, an internal combustion engine comprises: an internal combustion engine body; a turbocharger including a compressor that is connected to the internal combustion engine body via a piping and supplies combustion gas to the internal combustion engine body, and a turbine that coaxially rotates with the compressor; an electric motor that drives the turbocharger; an opening and shutting device that opens and shuts between the piping and outside of the piping, the piping being provided between the internal combustion engine body and the compressor; and a control device that drives and controls the electric motor and the opening and shutting device. The control device brings the piping and the outside of the piping into an open state by driving the opening and shutting device at or before a time point, at which a turbine rotational speed reaches a surging rotational speed that has been set beforehand, when the control device drives the turbocharger by driving the electric motor before starting of the internal combustion engine body is started.

Therefore, when the turbocharger is driven by the electric motor being driven before starting of the internal combustion engine body is started, the piping and the outside of the piping are brought into the open state at or before the time point, at which the turbine rotational speed reaches the surging rotational speed. That is, since the flow rate of the air supplied to the internal combustion engine body from the turbocharger is adjusted upon starting of the internal combustion engine; the air pressure-fed to the cylinders is prevented from becoming highly pressured at low flow rate and surging is prevented from occurring upon the starting of the internal combustion engine, and thereby, controllability of the internal combustion engine is able to be improved.

Advantageously, the internal combustion engine further comprises: a power storage unit that supplies power to the electric motor. The control device starts power storage into the power storage unit and brings the piping and the outside of the piping into the open state by driving the opening and shutting device.

Therefore, since the power storage into the power storage unit is started and the piping and the outside of the piping are brought into the open state, starting of the internal combustion engine is performed by use of the electric motor for driving the compressor, without use of another device, such as an auxiliary blower, and thus, starting of the internal combustion engine is able to be improved while increase in the equipment cost is prevented.

Advantageously, the internal combustion engine further comprises: an internal combustion engine rotation starting device that starts starting of rotation of the internal combustion engine body without supplying fuel to the internal combustion engine body. The control device brings the piping and the outside of the piping into a shut state by driving the opening and shutting device after driving the internal combustion engine rotation starting device.

Therefore, by causing the piping and the outside of the piping to be brought into the shut state after the internal combustion engine rotation starting device is driven, the pressure ratio and the flow rate of the combustion gas are able to be brought closer to the surge line without going over the surge line, and thus the turbine rotational speed and the rotational speed of the internal combustion engine are able to be increased early, and smooth starting of the internal combustion engine is able to be executed.

Advantageously, in the internal combustion engine, the control device brings the piping and the outside of the piping into a/the shut state by driving the opening and shutting device after an exhaust valve of the internal combustion engine body starts being driven to be opened and shut.

Therefore, the turbine rotational speed and the rotational speed of the internal combustion engine are able to be increased early, and smooth starting of the internal combustion engine is able to be executed.

Advantageously, in the internal combustion engine, the opening and shutting device is a flow regulating valve, and the control device increases opening of the flow regulating valve at a predetermined change rate that has been set beforehand, when the opening and shutting device is driven.

Therefore, since the opening of the flow regulating valve is increased at the predetermined change rate upon starting of the air releasing device, fuel efficiency is able to be improved.

According to another aspect of the present invention, a control device of an internal combustion engine comprises: an internal combustion engine body; a turbocharger including a compressor that is connected to the internal combustion engine body via a piping and supplies combustion gas to the internal combustion engine body and a turbine that coaxially rotates with the compressor; an electric motor that drives the turbocharger; and an opening and shutting device that opens and shuts between the piping and outside of the piping, the piping being provided between the internal combustion engine body and the compressor. The control device brings the piping and the outside of the piping into an open state by driving the opening and shutting device at or before a time point, at which a turbine rotational speed reaches a surging rotational speed that has been beforehand, when the control device drives the turbocharger by driving the electric motor before starting of the internal combustion engine body is started.

Therefore, since the flow rate of the air supplied to the internal combustion engine body from the turbocharger is adjusted before starting of the internal combustion engine is started, the air pressure-fed to the cylinders is prevented from becoming highly pressured at low flow rate, and surging is prevented from occurring upon starting of the internal combustion engine, and thereby, controllability of the internal combustion engine is able to be improved.

According to still another aspect of the present invention, a method of controlling an internal combustion engine includes: starting power storage into a power storage unit; driving a compressor by starting driving an electric motor with power in the power storage unit after voltage in the power storage unit reaches a standby voltage that has been set beforehand; opening and shutting between a piping and outside of the piping, the piping being provided between an internal combustion engine body and the compressor, at or before a time point, at which a turbine rotational speed reaches a surging rotational speed that has been beforehand; starting the internal combustion engine without supplying fuel when a turbine rotational speed reaches an internal combustion engine start-up rotational speed that has been set beforehand; and supplying fuel to the internal combustion engine when a rotational speed of the internal combustion engine reaches a fuel supply start rotational speed that has been set beforehand.

Therefore, since the flow rate of the air supplied to the internal combustion engine body from the turbocharger is adjusted upon starting of the internal combustion engine, the air pressure-fed to the cylinders is prevented from becoming highly pressured at low flow rate, and surging is prevented from occurring upon the starting of the internal combustion engine, and thereby, controllability of the internal combustion engine is able to be improved.

Advantageous Effects of Invention

According to an internal combustion engine, and a device and a method for controlling the internal combustion engine, of the present invention, by surging being prevented from occurring upon starting of the internal combustion engine, controllability of the internal combustion engine is able to be improved.

DESCRIPTION OF EMBODIMENTS

Hereinafter, preferred embodiments of an internal combustion engine, and a device and a method for controlling the internal combustion engine, according to the present invention will be described in detail, with reference to the appended drawings. The present invention is not limited by these embodiments, and when there are plural embodiments, the present invention includes those configured of any combinations of the respective embodiments.

[First Embodiment]

Figure 1:
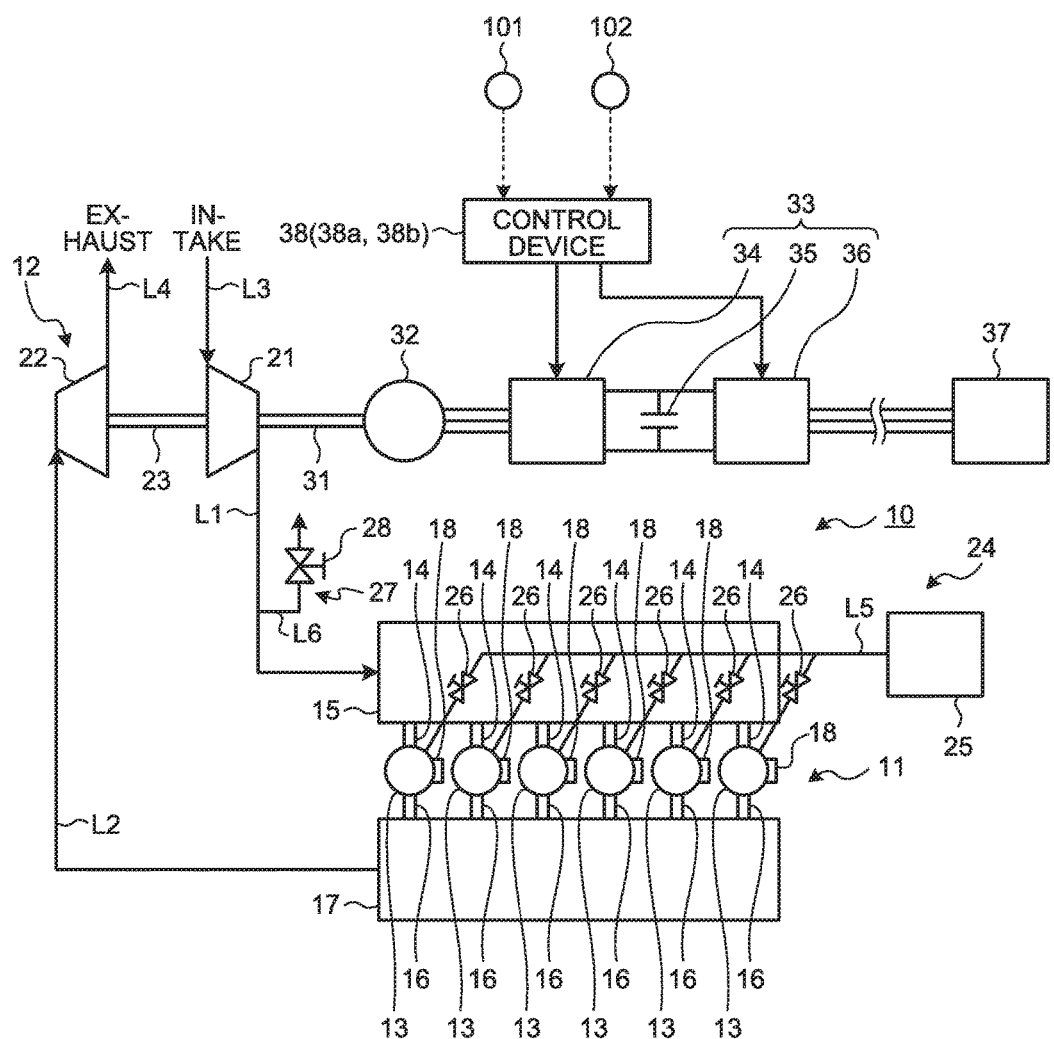
FIG. 1 is a schematic block diagram illustrating an internal combustion engine of a first embodiment.

FIG. 1 is a schematic block diagram illustrating an internal combustion engine of a first embodiment.

In this first embodiment, as illustrated in FIG. 1, a marine diesel engine 10 serving as the internal combustion engine, includes a diesel engine body 11, an turbocharger 12, and a control device 38. The diesel engine body 11 has plural cylinder units 13 provided therein, and although illustration thereof will be omitted, inside each of the cylinder units 13, a piston is supported to be able to freely reciprocate, and a lower portion of each of the pistons is coupled to a crank shaft via a cross head.

An intake manifold 15 is coupled to the cylinder units 13 via intake ports 14, and an exhaust manifold 17 is coupled to the cylinder units 13 via exhaust ports 16. The intake manifold 15 is coupled to a compressor 21 of the turbocharger 12 via an intake pipe L1. Further, the exhaust manifold 17 is coupled to a turbine 22 of the turbocharger 12 via an exhaust pipe L2. Further, in the cylinder units 13, injectors 18 serving as a fuel supply device that injects fuel (for example, heavy oil, or natural gas) into the cylinder units 13 are respectively provided. A fuel tank not illustrated is coupled to each of the injectors 18.

Further, the diesel engine body 11 has an engine rotation starting device 24 provided therein, the engine rotation starting device 24 being able to start an engine without injecting fuel into the cylinder units 13. The engine rotation starting device 24 is a device that actuates non-illustrated pistons of the cylinder units 13, by, for example, supplying actuation gas to the cylinder units 13. The engine rotation starting device 24 includes an actuation gas supply source 25 (for example, an accumulator and a pump), on-off valves 26, and an actuation gas supply pipe L5. The actuation gas supply source 25 is coupled to a proximal end portion of the actuation gas supply pipe L5, distal end portions of the actuation gas supply pipe L5 are coupled to the respective cylinder units 13, and the plural on-off valves 26 corresponding to the respective cylinder units 13 are provided in the actuation gas supply pipe L5. The engine rotation starting device 24 repeats supplying the actuation gas of the actuation gas supply source 25 from the actuation gas supply pipe L5 to the cylinder units 13 and stopping of the supplying, by controlling on-off of the respective on-off valves 26 upon starting of the marine diesel engine 10. Thereby, without the fuel being injected into the cylinder units 13, the non-illustrated pistons provided in the cylinder units 13 are able to be actuated and rotation (driving) of the crank shafts is able to be started via the cross heads.

Further, the diesel engine 10 has an opening and shutting device 27 that opens and shuts between an intake pipe (piping) L1 provided between the diesel engine body 11 and the compressor 21 and outside of this intake pipe L1. That is, a proximal end portion of a release pipe L6 forming the opening and shutting device 27 is coupled to the intake pipe L1, a distal end portion of the release pipe L6 is open to the atmosphere, and a relief valve (an on-off valve or a flow regulating valve) 28 is provided in the release pipe L6. Therefore, by opening the relief valve 28 upon starting of the marine diesel engine 10, flow rate or pressure of the combustion gas compressed by the compressor 21 of the turbocharger 12 and supplied to the cylinder units 13 is able to be reduced.

The turbocharger 12 is formed of the compressor 21 and the turbine 22 coupled coaxially to each other via a rotating shaft 23, and the compressor 21 and the turbine 22 are able to be integrally rotated by the rotating shaft 23. An intake pipe L3 that takes in air from outside is coupled to the compressor 21, and the intake pipe L1 leading to the intake manifold 15 is coupled to the compressor 21. The exhaust pipe L2 leading to the exhaust manifold 17 is coupled to the turbine 22, and an exhaust pipe L4, through which gas is discharged outside, is coupled to the turbine 22.

Thus, after being driven by exhaust gas (combustion gas) guided through the exhaust pipe L2 from the exhaust manifold 17 and driving the compressor 21, the turbine 22 discharges the exhaust gas to outside from the exhaust pipe L4. After being driven by the turbine 22 and compressing gas, such as air, taken in from the intake pipe L3, the compressor 21 pressure-feeds the compressed gas, such as air, as combustion gas, from the intake pipe L1 to the intake manifold 15.

The turbocharger 12 is a hybrid turbocharger, and a motor generator (electric motor) 32 is coupled to the turbocharger 12 via a rotating shaft 31 that is coaxial with the rotating shaft 23 of the compressor 21 and the turbine 22. Although illustration thereof will be omitted, the motor generator 32 is formed of a rotor fixed to the rotating shaft 31, and a stator fixed to a casing and arranged around the rotor. This motor generator 32 has a power generating function for generating power by being driven by exhaust gas, and has an electric motor function for driving and rotating the compressor 21 and the turbine 22.

The turbocharger 12 includes a power converting device 33. The power converting device 33 includes a first power converting unit 34, a power storage unit 35, and a second power converting unit 36. The first power converting unit 34 is connected to the motor generator 32, and converts alternating current power generated by the motor generator 32 to direct current power and outputs the direct current power, upon regenerative operation of the motor generator 32. The second power converting unit 36 is connected to an inboard power system 37, and converts the direct current power from the first power converting unit 34 to three phase alternating current power suitable for the inboard power system 37 and outputs the three phase alternating current power to the inboard power system 37, upon the regenerative operation of the motor generator 32. The power storage unit 35 is connected between the first power converting unit 34 and the second power converting unit 36, and stores a predetermined amount of the direct current power from the first power converting unit 34. The power storage unit 35 is provided for smoothing the power output to the second power converting unit 36, and outputs the stored power to the second power converting unit 36 when the regenerative operation of the motor generator 32 is started. The power output to the second power converting unit 36 after the regenerative operation is started is output from the motor generator 32 via the first power converting unit 34.

Further, the second power converting unit 36 converts the three phase alternating current power from the inboard power system 37 to direct current power and outputs the direct current power to the first power converting unit 34, upon powering operation of the motor generator 32. The first power converting unit 34 converts the direct current power from the second power converting unit 36 to alternating current dielectric strength and outputs the alternating current dielectric strength to the motor generator 32, upon the powering operation of the motor generator 32. The power storage unit 35 stores a predetermined amount of the direct current power from the second power converting unit 36. The power storage unit 35 is provided for smoothing the power output to the first power converting unit 34, and outputs the stored power to the first power converting unit 34 when the powering operation of the motor generator 32 is started. The power output to the first power converting unit 34 after the powering operation is started is output from the inboard power system 37 via the second power converting unit 36.

Although details of a configuration of the power converting device 33 will not be described, for example, the first power converting unit 34 is a converter, the power storage unit 35 is a condenser, and the second power converting unit 36 is an inverter.

The control device 38 includes a first control device 38a that controls the motor generator 32, and a second control device 38b that controls the diesel engine body 11.

The first control device 38a is able to control the motor generator 32 by controlling the first power converting unit 34 and the second power converting unit 36. That is, the first control device 38a controls functions of the first power converting unit 34 and the second power converting unit 36, according to a driving state (a regenerative operation state or a powering operation state) of the motor generator 32.

The second control device 38b is able to drive and control the injectors 18 (fuel supply device) 18 and the engine rotation starting device 24, which are in the diesel engine body 11. Further, the second control device 38b controls fuel injection timing and fuel injection quantity by driving and controlling the respective injectors 18. Furthermore, the second control device 38b controls actuation gas supply timing and actuation gas supply quantity to the cylinders 13 by controlling on-off of the on-off valves 26 forming the engine rotation starting device 24.

Further, in the first embodiment, the control device 38 brings the intake pipe L1 and the outside of the intake pipe L1 into an open state by driving the opening and shutting device 27, at or before a time point, at which a turbine rotational speed reaches a surging rotational speed that has been set beforehand, when driving the turbocharger 12 by driving the motor generator 32 before driving the injectors 18 upon starting of the diesel engine body 11. When an engine rotation start-up signal (internal combustion engine rotation start-up signal) 102 is input and a turbine rotational speed (the turbine rotational speed being equal to "compressor rotational speed" or "turbocharger rotational speed") reaches an engine rotation start-up rotational speed (internal combustion engine rotation start-up rotational speed) that has been set beforehand, the control device 38 then starts air running, in which supplying of actuation gas to the diesel engine body 11 and stopping the supplying are repeated by controlling on-off of the on-off valves 26. The control device 38 then starts supplying fuel to the diesel engine body 11 by driving the respective injectors 18, when a rotational speed of the marine diesel engine 10 reaches a fuel supply start rotational speed that has been set beforehand.

Specifically, when a motoring starting preparation signal 101 is input, by controlling the second power converting unit 36, the control device 38 converts the three phase alternating current power from the inboard power system 37 to direct current power, stores the direct current power in the power storage unit 35, and causes voltage in the power storage unit 35 to reach a standby voltage that has been set beforehand and the control device 38 opens the relief valve 28. Further, when the voltage in the power storage unit 35 reaches the standby voltage, by controlling the first power converting unit 34, the control device 38 converts the direct current power in the power storage unit 35 to alternating current power and starts driving the motor generator 32. Thereafter, power from the inboard power system 37 is output to the motor generator 32, and the turbine rotational speed is caused to reach the engine rotation start-up rotational speed and to be maintained thereat. When the engine rotation start-up signal 102 is input, the control device 38 increases an engine rotational speed, by controlling on-off of the respective on-off valves 26 to start air running, in which supplying the actuation gas to the diesel engine body 11 and stopping the supplying are repeated. When the engine rotational speed reaches the fuel supply start rotational speed that has been set beforehand, the control device 38 supplies fuel to the diesel engine body 11 by driving the respective injectors 18. The marine diesel engine 10 then starts operation by combustion.

The motoring starting preparation signal 101 and the engine rotation start-up signal 102 are output by an inboard person in charge operating an operation panel (illustration thereof omitted), and a switch for sending the motoring starting preparation signal 101 and a switch for sending the engine rotation start-up signal 102 are provided therein.

Figure 2:
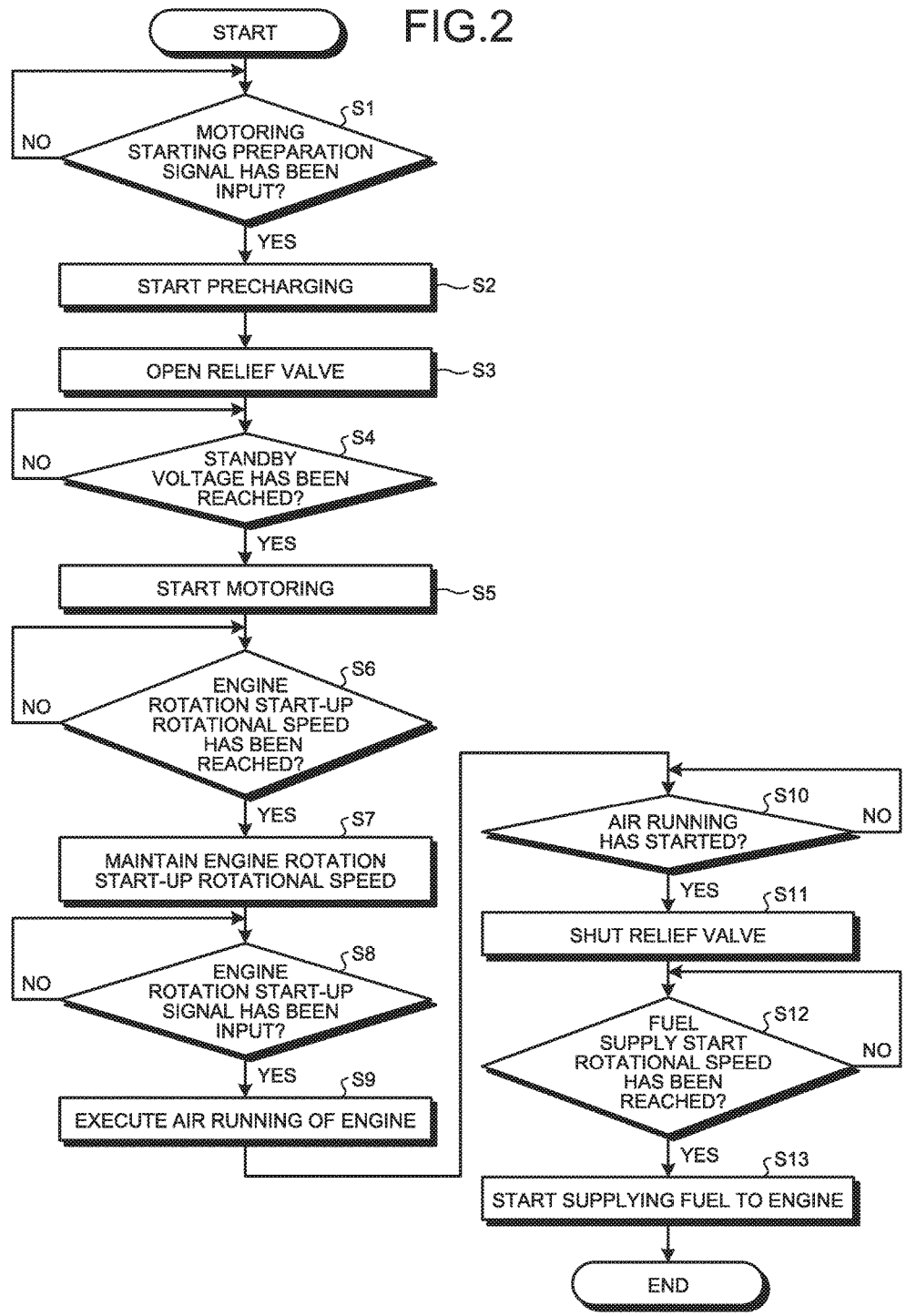
FIG. 2 is a flow chart illustrating a method of controlling the internal combustion engine of the first embodiment.
Figure 3:
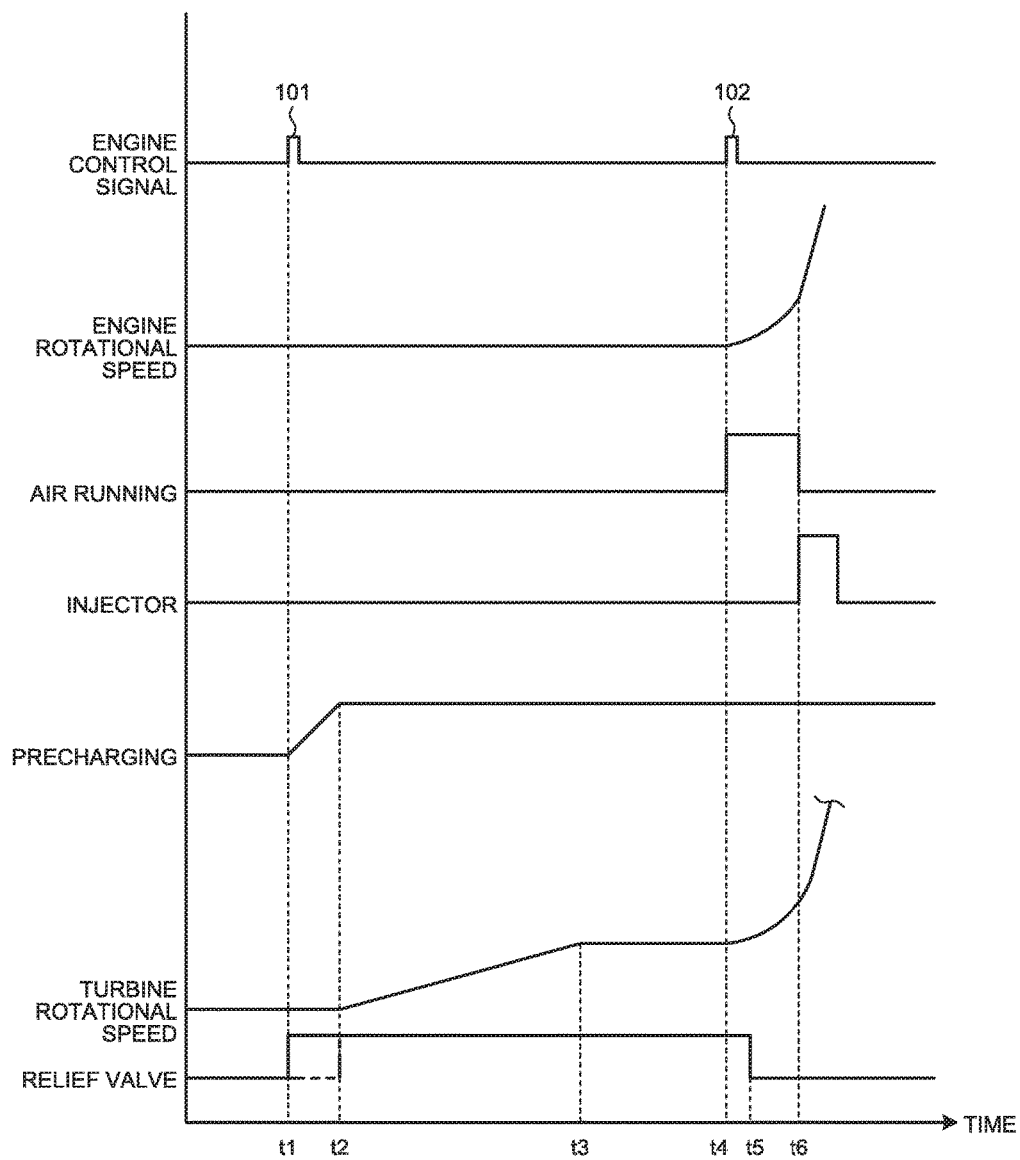
FIG. 3 is a time flow chart illustrating the method of controlling the internal combustion engine.

A starting method using the control device of the internal combustion engine of the first embodiment will be described in detail by use of a flow chart and a time chart. FIG. 2 is a flow chart illustrating a method of controlling the internal combustion engine of the first embodiment, and FIG. 3 is a time flow chart illustrating the method of controlling the internal combustion engine.

In the method of controlling the internal combustion engine of the first embodiment, as illustrated in FIG. 1 and FIG. 2, at Step 51, the control device 38 determines whether the motoring starting preparation signal 101 has been input. If it is determined ("No") that the motoring starting preparation signal 101 has not been input, the control device 38 stands ready. On the contrary, if it is determined ("Yes") that the motoring starting preparation signal 101 has been input, at Step S2, the control device 38 converts the three phase alternating current power from the inboard power system 37 to direct current power and stores the direct current power in the power storage unit 35, that is, the control device 38 starts precharging, by controlling the second power converting unit 36. Further, at Step S3, the control device 38 opens the relief valve 28. At Step S4, the control device 38 has detected a DC bus voltage of the power storage unit 35 and determines whether the DC bus voltage has become equal to or greater than a prescribed value, that is, equal to or greater than the above mentioned standby voltage.

If it is determined ("No") that the DC bus voltage of the power storage unit 35 has not reached the standby voltage, precharging is continued. On the contrary, if it is determined ("Yes") that the DC bus voltage of the power storage unit 35 has reached the standby voltage; at Step S5, the control device 38 converts the direct current power in the power storage unit 35 to alternating current power and starts driving the motor generator 32 by controlling the first power converting unit 34, outputs power from the inboard power system 37, and starts motoring. That is, by the motor generator 32, the compressor 21 and the turbine 22 of the turbocharger 12 are driven and rotated, and the turbine rotational speed is increased. At Step S6, the control device 38 determines whether the motoring has stabilized, and the turbine rotational speed (compressor rotational speed) has reached the engine rotation start-up rotational speed.

If it is determined ("No") that the turbine rotational speed has not reached the engine rotation start-up rotational speed, the turbine rotational speed is increased further. When this is done, since the diesel engine body 11 has not started (started rotating), non-illustrated exhaust valves of the cylinder units 13 are shut. That is, since the combustion gas pressure-fed by the compressor 21 to the cylinder units 13 is not discharged from the cylinder units 13, surging may occur. However, at Step S3, the relief valve 28 is open, and a part of the combustion gas flowing through the intake pipe L1 is discharged from the release pipe L6, and surging is prevented from occurring.

If it is determined ("Yes") that the turbine rotational speed has reached the engine rotation start-up rotational speed; at Step S7, the increasing of the turbine rotational speed is stopped, and that rotational speed is maintained. The control device 38 then waits for input of the engine rotation start-up signal 102. In this case, the control device 38 maintains the DC bus voltage of the power storage unit 35 at the standby voltage (for example, 600 V), and maintains the turbine rotational speed at the engine rotation start-up rotational speed (for example, 500 rpm).

Thereafter, at Step S8, the control device 38 determines whether the engine rotation start-up signal 102 has been input. If it is determined ("No") that the engine rotation start-up signal 102 has not been input, this standby state is maintained. On the contrary, if it is determined ("Yes") that the engine rotation start-up signal 102 has been input; at Step S9, by on-off of the on-off valves 26 being controlled and the actuation gas being supplied to the diesel engine body 11, air running is executed and the engine rotational speed is increased. This air running is reciprocating the pistons by repeating supplying of the actuation gas into the cylinder units 13 of the diesel engine body 11 and stopping the supplying, and thereby rotating the crank shafts via the cross heads. Thereafter, when the rotational speed of the crank shafts becomes equal to or greater than a predetermined rotational speed, the non-illustrated exhaust valves start their opening and shutting operation.

Thereafter, at Step S10, the control device 38 determines whether air running has started. If it is determined ("Yes") that air running has been started; at Step S11, the relief valve 28 is shut. In the processing of Step S10, determination of whether the non-illustrated exhaust valves have started their opening and shutting operation may be performed, instead of the determination of whether air running has started.

At Step S12, the control device 38 determines whether the engine rotational speed has reached the fuel supply start rotational speed (for example, 5 rpm). If it is determined ("No") that the engine rotational speed has not reached the fuel supply start rotational speed, air running is continued. On the contrary, if it is determined ("Yes") that the engine rotational speed has reached the fuel supply start rotational speed; at Step S13, the respective injectors 18 are driven, and fuel is injected into the cylinder units 13 (combustion chamber) of the diesel engine body 11. The marine diesel engine 10 then starts combustion by igniting the fuel in the cylinder units 13 (combustion chamber), and thus combustion operation is able to be started.

Further, operation timing of the control device of the internal combustion engine of the first embodiment will be described. As illustrated in FIG. 1 and FIG. 3, when the motoring starting preparation signal 101 is output at a time t1, by the second power converting unit 36 converting the three phase alternating current power from the inboard power system 37 to direct current power and storing the direct current power into the power storage unit 35, precharging is started and the DC bus voltage of the power storage unit 35 is increased. When this is done, the relief valve 46 is opened. When the DC bus voltage of the power storage unit 35 becomes the standby voltage at a time t2, the DC bus voltage of the power storage unit 35 is maintained at the standby voltage. By the first power converting unit 34 converting the direct current power of the power storage unit 35 to alternating current power and starting driving the motor generator 32, and outputting the power from the inboard power system 37 to the motor generator 32, the turbine rotational speed is increased. When the turbine rotational speed reaches the engine rotation start-up rotational speed at a time t3, the turbine rotational speed is maintained at this engine rotation start-up rotational speed.

When this is done, the non-illustrated exhaust valves of the cylinder units 13 maintain their shut state, but the relief valve 28 is open, and thereby, a part of the combustion gas flowing through the intake pipe L1 is discharged from the release pipe L6 and thus surging is prevented from occurring. When the turbine rotational speed reaches the engine rotation start-up rotational speed at the time t3, the turbine rotational speed is maintained at this engine rotation start-up rotational speed.

In the state where the turbine rotational speed is maintained at the engine rotation start-up rotational speed, input of the engine rotation start-up signal 102 is waited for. When the engine rotation start-up signal 102 is input at a time t4, by air running of repeating opening and stopping opening the on-off valves being executed, the engine rotational speed is increased. When this is done, by the actuation gas supplied to the cylinder units 13 through air running and the combustion gas pressure-fed by the compressor 21 being discharged, the turbine 22 is rotated, and thus the turbine rotational speed is also increased. At a time t5, when air running has started, the relief valve 28 is shut. Further, when the engine rotational speed reaches the fuel supply start rotational speed at a time t6, the injectors 18 are driven and the injectors 18 inject fuel into the cylinder units 13. The marine diesel engine 10 then starts combustion in the cylinder units 13 (combustion chamber), the engine rotational speed increases to a prescribed rotational speed, and the combustion operation is started.

Figure 4:
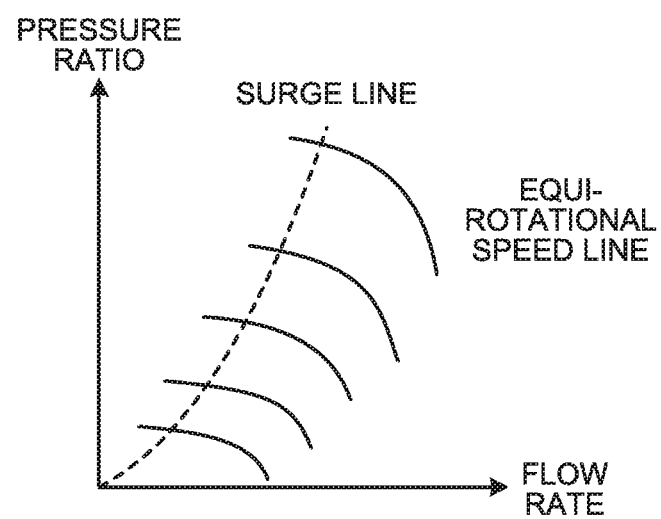
FIG. 4 is a graph illustrating a surge line of the internal combustion engine.
Figure 5:
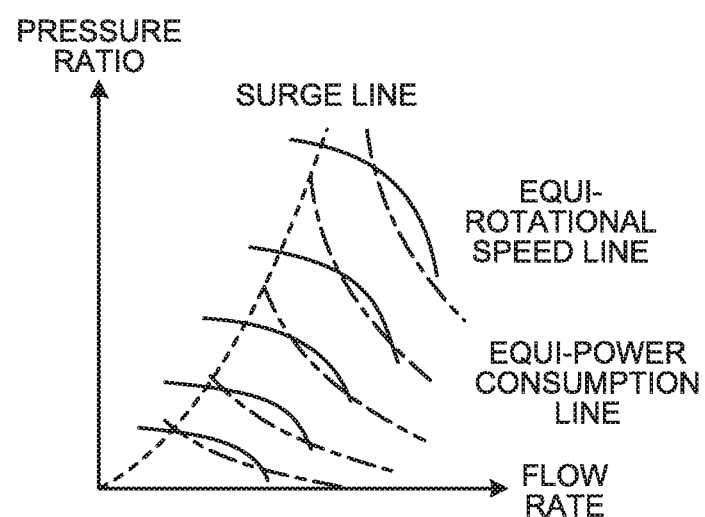
FIG. 5 is a graph illustrating a surge line of the internal combustion engine, the surge line in consideration of power consumption.

FIG. 4 is a graph illustrating a surge line of the internal combustion engine, and FIG. 5 is a graph illustrating a surge line of the internal combustion engine, the surge line in consideration of power consumption. These graphs differ depending on internal combustion engines, and are generated from design conditions and past data. The graph in FIG. 4 is a graph illustrating pressure ratio of the combustion gas in the cylinder units 13 with respect to the flow rate of the combustion gas supplied to the cylinder units 13. As described above, since surging occurs if the combustion gas pressure-fed by the compressor 21 to the cylinder units 13 is not discharged from the cylinder units 13, a surge line is formed between the flow rate and the pressure ratio of the combustion gas. If the flow rate of the combustion gas is increased going over the surge line, or if the pressure ratio of the combustion gas is increased going over the surge line, surging occurs. Further, with respect to this surge line, an equi-rotational speed line is provided. Thus, the control device 38 adjusts the opening of the relief valve 28 according to the engine rotational speed, such that the flow rate and the pressure ratio of the combustion gas do not go over the surge line.

Further, the graph in FIG. 5 is a graph illustrating the pressure ratio of the combustion gas in the cylinder units 13 with respect to the flow rate of the combustion gas supplied to the cylinder units 13, and is a graph, in which an equi-power consumption line is written in addition to the equi-rotational speed line. The closer they are to the surge line, the less the power consumption of the motor generator 32 is. Thus, the control device 38 adjusts the opening of the relief valve 28 according to the engine rotational speed and the power consumption, such that the flow rate and the pressure ratio of the combustion gas do not go over the surge line.

As described, in the internal combustion engine of this first embodiment, the diesel engine body 11, the turbocharger 12, the motor generator 32, the power storage unit 35, the engine rotation starting device 24 (the actuation gas supply pipe L5, the actuation gas supply source 25, and the on-off valves 26), the fuel supply device (injectors 18), the opening and shutting device 27 (the relief valve 28), and the control device 38, which controls the motor generator 32, the engine rotation starting device 24, the injectors 18, and the opening and shutting device 27, are provided; and the control device 38 opens the relief valve 28 at or before a time point, at which the turbine rotational speed reaches the surging rotational speed that has been set beforehand, when the turbocharger 12 is driven by the motor generator 32 being driven before the injectors 18 are driven upon starting of the diesel engine body 11.

Therefore, when the turbocharger 12 is rotated by the motor generator 32 before starting of the diesel engine body 11, the relief valve 28 is opened at or before the time point, at which the turbine rotational speed reaches the surging rotational speed. That is, upon starting of the diesel engine body 11, since the flow rate of the combustion gas supplied to the cylinder units 13 from the turbocharger 12 is adjusted, surging is able to be prevented from occurring, and as a result, controllability of the internal combustion engine is able to be improved. In this case, the timing to open the relief valve 28 is preferably immediately before the turbine rotational speed reaches the surging rotational speed. Thereby, the pressure ratio and the flow rate of the combustion gas approach the surge line without going over the surge line, and thus power consumption of the motor generator 32 is able to be reduced further.

When the motoring starting preparation signal 101 is input, the control device of the internal combustion engine of the first embodiment starts power storage into the power storage unit 35 and opens the relief valve 28; when the voltage in the power storage unit 35 reaches the standby voltage, the control device starts driving the motor generator 32 by use of the power in the power storage unit 35, outputs power from the inboard power system 37 to the motor generator 32, and maintains the turbine rotational speed at the engine rotation start-up rotational speed; when the engine rotation start-up signal 102 is input, the control device drives the engine rotation starting device 24; and when the engine rotational speed reaches the fuel supply start rotational speed, the control device drives the fuel supply device. Therefore, since the relief valve 28 is able to be opened at the stage where the motoring starting preparation signal 101 is input (at the state where power storage into the power storage unit 35 is started), the discharge destination of the combustion gas is able to be secured before the motor generator 32 is driven and supply of the combustion gas by the turbocharger (compressor 21) 12 is started. As a result, surging is able to be prevented more infallibly.

The control device of the internal combustion engine of the first embodiment shuts the relief valve 28 after driving the internal combustion engine rotation starting device. After the internal combustion engine rotation starting device 24 is driven; since the opening and shutting operation of the exhaust valve is started, as compared to those before the internal combustion engine rotation starting device 24 is driven, the pressure ratio and the flow rate of the combustion gas in the cylinder units 13 become lower. Thus, by shutting the relief valve 28 with the combustion gas, the pressure ratio and the flow rate of the combustion gas are able to be made closer to the surge line without going over the surge line. Thereby, the turbine rotational speed and the engine rotational speed are able to be increased early, and smooth starting of the marine diesel engine 10 is able to be executed.

Further, the method of controlling the internal combustion engine of this first embodiment has: a process of receiving the motoring starting preparation signal 101 and starting power storage into the power storage unit 35; a process of starting driving of the motor generator 32 by use of the power in the power storage unit 35 after the voltage in the power storage unit 35 has reached the standby voltage, outputting power from the inboard power system 37 to the motor generator 32, and driving the turbocharger 12; a process of opening the relief valve 28 at or before the time point, at which the turbine rotational speed reaches the surging rotational speed; and a process of receiving the engine rotation start-up signal 102 and supplying fuel to the cylinder units 13 when the turbine rotational speed reaches the fuel supply start rotational speed.

Therefore, upon starting of the diesel engine body 11, since the flow rate of the combustion gas supplied to the cylinder units 13 from the turbocharger 12 is adjusted, surging is able to be prevented from occurring, and as a result, controllability of the internal combustion engine is able to be improved.

In this first embodiment, when the motoring starting preparation signal (first starting signal) 101 is input, the control device 38 opens the relief valve 28, but the timing to open the relief valve 28 is not limited to this timing. For example, as illustrated with a two-dot chain line in FIG. 3, the timing may be when the DC bus voltage of the power storage unit 35 becomes the standby voltage, or when driving of the motor generator 32 is started by the direct current power in the power storage unit 35.

[Second Embodiment]

Figure 6:
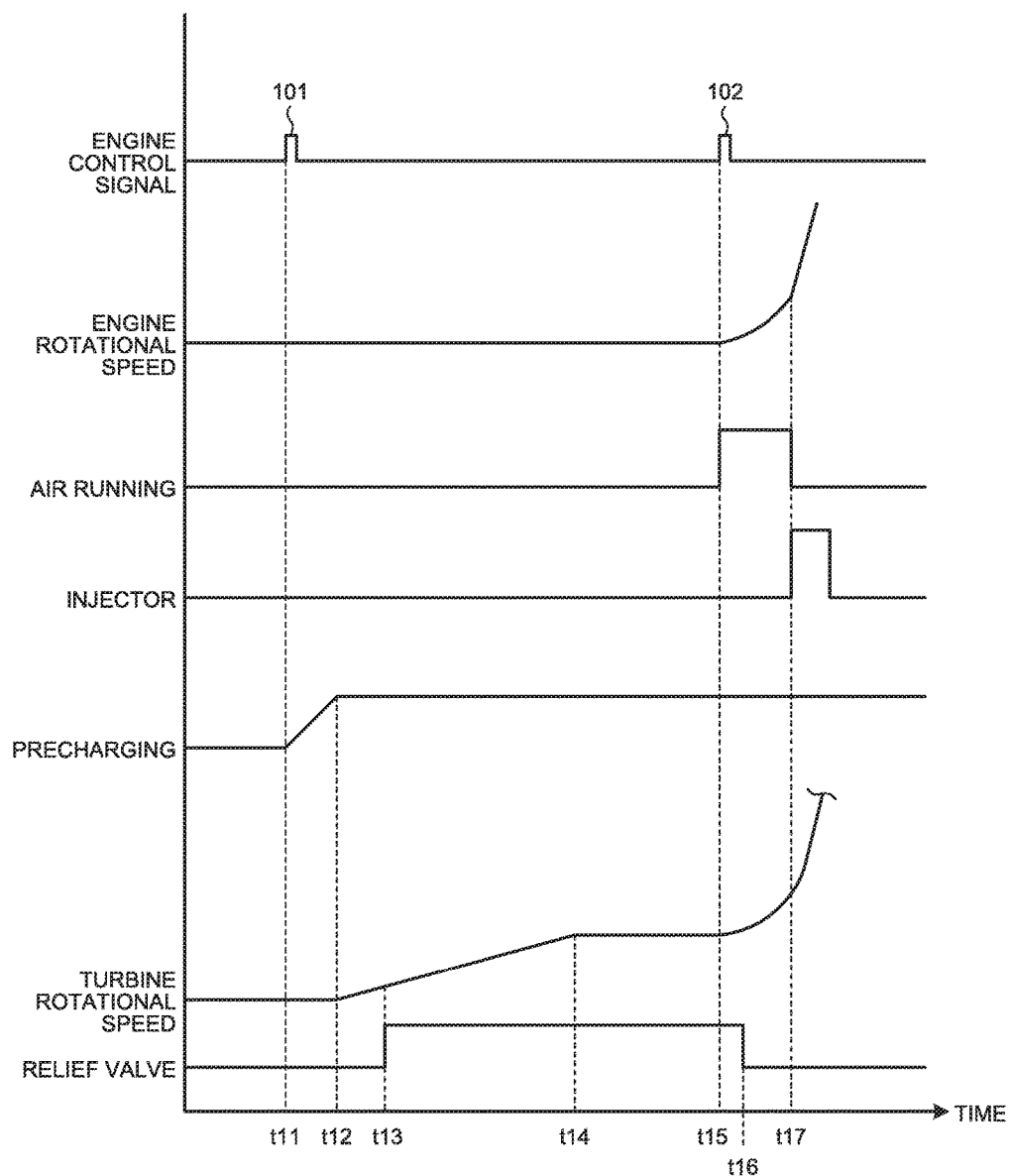
FIG. 6 is a time flow chart illustrating a method of controlling an internal combustion engine of a second embodiment.

FIG. 6 is a time flow chart illustrating a method of controlling an internal combustion engine of a second embodiment. A basic configuration of a control device of the internal combustion engine of this embodiment is substantially the same as the above described configuration of the first embodiment, and will be described by use of FIG. 1; and the same signs will be appended to parts having functions that are the same as those of the above described first embodiment and detailed description thereof will be omitted.

According to the control device of the internal combustion engine of the second embodiment, as illustrated in FIG. 1 and FIG. 6, when the control device 38 causes the motor generator 32 to rotate the turbocharger 12 before starting of the diesel engine body 11, the control device 38 opens the relief valve 28 immediately before a time point, at which the turbine rotational speed reaches the surging rotational speed (the turbine rotational speed, the rotational speed generating combustion gas having a pressure ratio or a flow rate going over the surge line).

The method of controlling the internal combustion engine of the second embodiment will now be described. When the motoring starting preparation signal 101 is output at a time t11, by the second power converting unit 36 converting the three phase alternating current power from the inboard power system 37 to direct current power and storing the direct current power into the power storage unit 35, precharging is started and the DC bus voltage of the power storage unit 35 is increased. When the DC bus voltage of the power storage unit 35 becomes the standby voltage at a time t12, the DC bus voltage of the power storage unit 35 is maintained at the standby voltage. Further, the first power converting unit 34 starts driving the motor generator 32 by converting the direct current power in the power storage unit 35 to alternating current power. Thereafter, by output of power from the inboard power system 37 to the motor generator 32, the turbine turbine rotational speed is increased.

The turbine turbine rotational speed is then increased; and at a time t13, the relief valve 28 is opened immediately before a time point, at which the turbine turbine rotational speed reaches the surging rotational speed (for example, 20 rpm). Although the non-illustrated exhaust valves of the cylinder units 13 are shut when the turbine turbine rotational speed is increased, since the relief valve 28 is opened at this time point, a part of the combustion gas flowing through the intake pipe L1 is discharged from the release pipe L6 and surging is prevented from occurring. When the turbine rotational speed reaches the engine rotation start-up rotational speed at a time t14, the turbine rotational speed is maintained at this engine rotation start-up rotational speed.

In the state where the turbine rotational speed is maintained at the engine rotation start-up rotational speed, input of the engine rotation start-up signal 102 is waited for. When the engine rotation start-up signal 102 is input at a time t15, by execution of air running, in which opening the on-off valves 26 and stopping the opening are repeated, the engine rotational speed is increased. When this is done, by discharge of the actuation gas supplied to the cylinder units 13 through air running and the combustion gas pressure-fed by the compressor 21, the turbine 22 is rotated, and thus the turbine rotational speed is also increased. At a time t16, when air running has started, the relief valve 28 is shut. Further, when the engine rotational speed reaches the fuel supply start rotational speed at a time t17, the injectors 18 are driven and the injectors 18 inject fuel into the cylinder units 13.

As described above, the control device of the internal combustion engine of the second embodiment opens the relief valve 28 as the turbine rotational speed reaches the surging rotational speed, when the control device causes the motor generator 32 to rotate the turbocharger 12 upon starting of the diesel engine body 11.

Therefore, upon starting of the diesel engine body 11, since the flow rate of the combustion gas supplied to the cylinder units 13 from the turbocharger 12 is adjusted, surging is able to be prevented from occurring, and as a result, controllability of the internal combustion engine is able to be improved.

[Third Embodiment]

Figure 7:
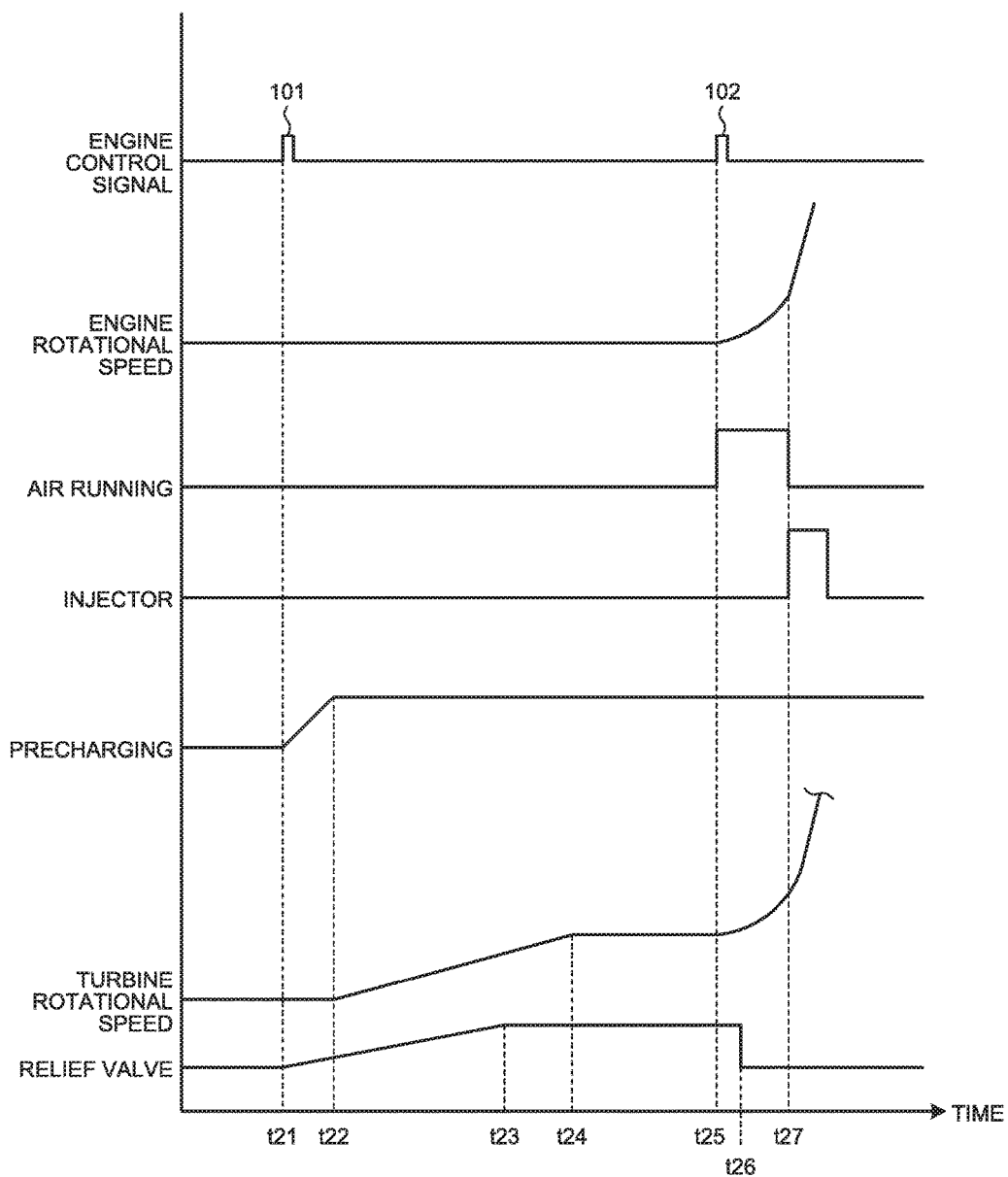
FIG. 7 is a time flow chart illustrating a method of controlling an internal combustion engine of a third embodiment.

FIG. 7 is a time flow chart illustrating a method of controlling an internal combustion engine of a third embodiment. A basic configuration of a control device of the internal combustion engine of this embodiment is substantially the same as the above described configuration of the first embodiment, and will be described by use of FIG. 1; and the same signs will be appended to parts having functions that are the same as those of the above described first embodiment and detailed description thereof will be omitted.

According to the control device of the internal combustion engine of the third embodiment, as illustrated in FIG. 1 and FIG. 7, when the control device 38 causes the motor generator 32 to rotate the turbocharger 12 before starting of the diesel engine body 11, as the motoring starting preparation signal 101 is input, the control device 38 opens the relief valve 28 such that opening of the relief valve 28 increases at a predetermined change rate that has been set beforehand.

The method of controlling the internal combustion engine of the third embodiment will now be described. When the motoring starting preparation signal 101 is output at a time t21, by the second power converting unit 36 converting the three phase alternating current power from the inboard power system 37 to direct current power and storing the direct current power into the power storage unit 35, precharging is started and the DC bus voltage of the power storage unit 35 is increased. When this is done, the relief valve 28 is opened such that the opening of the relief valve28 is increased at the predetermined change rate. When the DC bus voltage in the power storage unit 35 becomes the standby voltage at a time t22, the DC bus voltage of the power storage unit 35 is maintained at the standby voltage. Further, the first power converting unit 34 converts the direct current power in the power storage unit 35 to alternating current power, and starts driving the motor generator 32. Thereafter, by output of power from the inboard power system 37 to the motor generator 32, the turbine turbine rotational speed is increased. In association with the increase in the turbine turbine rotational speed, the opening of the relief valve 28 is increased. The opening of the relief valve 28 becomes completely open at a time t23, but the timing when the opening of this relief valve 28 becomes fully open is desirably set according to the turbine turbine rotational speed.

Therefore, although the non-illustrated exhaust valves of the cylinder units 13 are shut when the turbine turbine rotational speed is increased, since the relief valve 28 is gradually opened then, a part of the combustion gas flowing through the intake pipe L1 is discharged from the release pipe L6 and surging is prevented from occurring. When the turbine rotational speed reaches the engine rotation start-up rotational speed at a time t24, the turbine rotational speed is maintained at this engine rotation start-up rotational speed.

In the state where the turbine rotational speed is maintained at the engine rotation start-up rotational speed, input of the engine rotation start-up signal 102 is waited for. When the engine rotation start-up signal 102 is input at a time t25, by execution of air running, in which opening the on-off valves 26 and stopping the opening are repeated, the engine rotational speed is increased. When this is done, by discharge of the actuation gas supplied to the cylinder units 13 through air running and the combustion gas pressure-fed by the compressor 21, the turbine 22 is rotated, and thus the turbine rotational speed is also increased. At a time t26, when air running has started, the relief valve 28 is shut. Further, when the engine rotational speed reaches the fuel supply start rotational speed at a time t27, the injectors 18 are driven and the injectors 18 inject fuel into the cylinder units 13.

As described above, the control device of the internal combustion engine of the third embodiment opens the relief valve 28 such that the opening of the relief valve 28 is increased at the predetermined change rate that has been set beforehand, as the motoring starting preparation signal 101 is input, when the control device causes the motor generator 32 to rotate the turbocharger 12 before starting of the diesel engine body 11.

Therefore, upon starting of the diesel engine body 11, since the flow rate of the combustion gas supplied to the cylinder units 13 from the turbocharger 12 is adjusted, surging is able to be prevented from occurring, and as a result, controllability of the internal combustion engine is able to be improved. Further, since the opening of the relief valve 28 is increased gradually, the flow rate and the pressure ratio of the combustion gas are able to be set near the surge line (see FIG. 5), and the power consumption of the motor generator 32 is able to be reduced.

In this third embodiment, the control device 38 gradually opens the relief valve 28 when the motoring starting preparation signal (first starting signal) 101 is input, but the control device 38 may gradually open the relief valve 28 when driving of the motor generator 32 is started as the DC bus voltage of the power storage unit 35 becomes the standby voltage.

[Fourth Embodiment]

Figure 8:
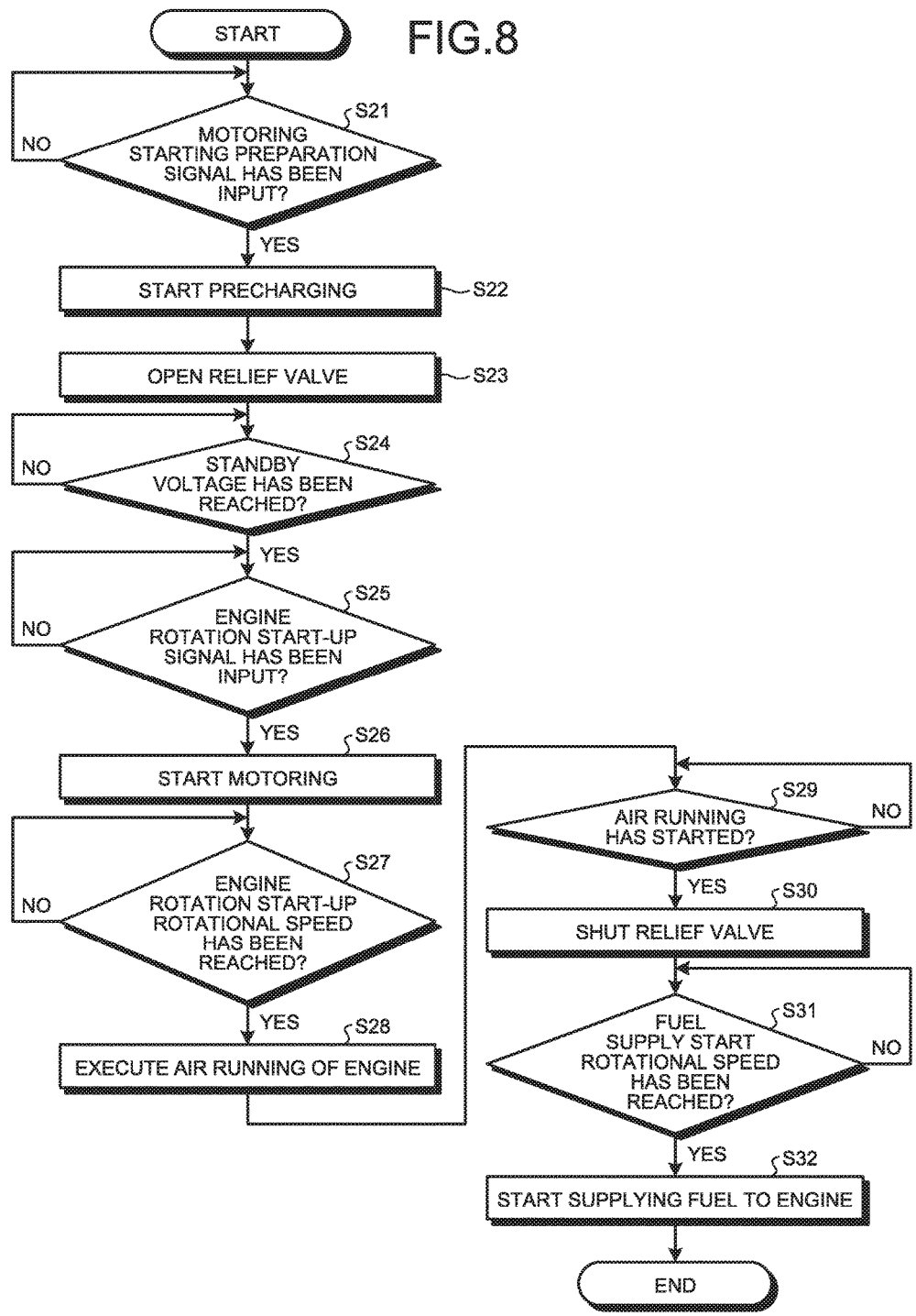
FIG. 8 is a flow chart illustrating a method of controlling an internal combustion engine of a fourth embodiment.
Figure 9:
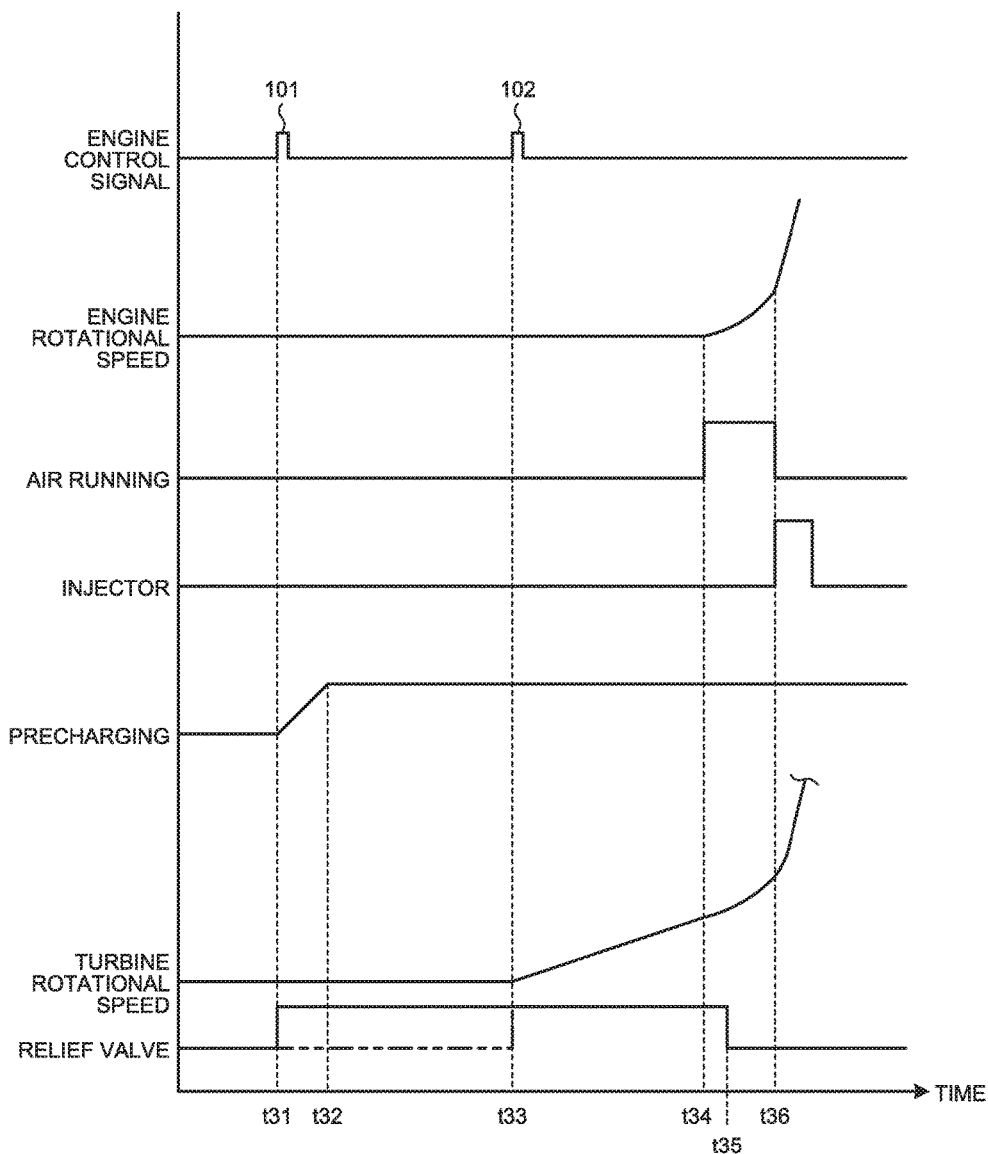
FIG. 9 is a time flow chart illustrating the method of controlling the internal combustion engine.

FIG. 8 is a flow chart illustrating a method of controlling an internal combustion engine of a fourth embodiment, and FIG. 9 is a time flow chart illustrating the method of controlling the internal combustion engine. A basic configuration of a control device of the internal combustion engine of this embodiment is substantially the same as the above described configuration of the first embodiment, and will be described by use of FIG. 1; and the same signs will be appended to parts having functions that are the same as those of the above described first embodiment and detailed description thereof will be omitted.

According to the control device of the internal combustion engine of the fourth embodiment, as illustrated in FIG. 1, when the motoring starting preparation signal 101 is input, the control device 38 converts the three phase alternating current power from the inboard power system 37 to direct current power, stores the direct current power into the power storage unit 35, and causes the direct current power to be maintained at a preset standby voltage, by controlling the second power converting unit 36; and discharges a part of combustion gas supplied to the cylinder units 13 by opening the relief valve 28. When the engine rotation start-up signal 102 is input, the control device 38 converts the direct current power in the power storage unit 35 to alternating current power and starts driving the motor generator 32, by controlling the first power converting unit 34. Thereafter, by output of power from the inboard power system 37 to the motor generator 32, the turbine rotational speed is increased. When the turbine rotational speed reaches the engine rotation start-up rotational speed, the engine rotational speed is increased by air running being started, through repetition of opening of the on-off valves 26 and stopping the opening and supply of actuation gas to the diesel engine body 11. When the engine rotational speed reaches the fuel supply start rotational speed, the control device 38 supplies fuel to the diesel engine body 11 by driving the respective injectors 18. The marine diesel engine 10 then starts combustion operation.

A starting method using the control device of the internal combustion engine of the fourth embodiment will be described in detail by use of a flow chart and a time chart.

In the method of controlling the internal combustion engine of the fourth embodiment, as illustrated in FIG. 1 and FIG. 8, at Step S21, the control device 38 determines whether the motoring starting preparation signal 101 has been input. If it is determined ("No") that the motoring starting preparation signal 101 has not been input, the control device 38 stands ready. On the contrary, if it is determined ("Yes") that the motoring starting preparation signal 101 has been input, at Step S22, the control device 38 starts converting three phase alternating current power from the inboard power system 37 to direct current power and storing the direct current power into the power storage unit 35, that is, precharging, by controlling the second power converting unit 36. Further, at Step S23, the control device 38 opens the relief valve 28.

At Step S24, the control device 38 has detected a DC bus voltage of the power storage unit 35 and determines whether the DC bus voltage of the power storage unit 35 has reached a standby voltage. If it is determined ("No") that the DC bus voltage of the power storage unit 35 has not reached the standby voltage, precharging is continued. On the contrary, if it is determined ("Yes") that the DC bus voltage of the power storage unit 35 has reached the standby voltage, the DC bus voltage is maintained at the standby voltage. The control device 38 then waits for input of the engine rotation start-up signal 102.

At Step S25, the control device 38 determines whether the engine rotation start-up signal 102 has been input. If it is determined ("No") that the engine rotation start-up signal 102 has not been input, this standby state is maintained. On the contrary, if it is determined ("Yes") that the engine rotation start-up signal 102 has been input; at Step S26, by controlling the first power converting unit 34, the control device 38 converts the direct current power in the power storage unit 35 to alternating current power and starts driving the motor generator 32. Thereafter, power from the inboard power system 37 is output to the motor generator 32, and motoring is started. That is, by the motor generator 32, the compressor 21 and the turbine 22 of the turbocharger 12 are driven and rotated, and the turbine rotational speed is increased. When this is done, since the diesel engine body 11 has not started, the non-illustrated exhaust valves of the cylinder units 13 are shut and surging may occur. However, at Step S13, the relief valve 28 is open, and a part of the combustion gas flowing through the intake pipe L1 is discharged from the release pipe L6, and surging is prevented from occurring.

At Step S27, the control device 38 determines whether the motoring has stabilized, and the turbine rotational speed has reached the engine rotation start-up rotational speed. If it is determined ("No") that the turbine rotational speed has not reached the engine rotation start-up rotational speed, the turbine rotational speed is increased further. When it is determined ("Yes") that the turbine rotational speed has reached the engine rotation start-up rotational speed; at Step S28, air running is executed and the engine rotational speed is increased, by opening of the on-off valves 26 and stopping the opening being repeated and the actuation gas being supplied to the diesel engine body 11.

Thereafter, at Step S29, the control device 38 determines whether air running has started. If it is determined ("Yes") that air running has been started; at Step S30, the relief valve 28 is shut. In the processing of Step S29, determination of whether the non-illustrated exhaust valves have started their opening and shutting operation may be made, instead of the determination of whether air running has started.

At Step S31, the control device 38 determines whether the engine rotational speed has reached the fuel supply start rotational speed. If it is determined ("No") that the engine rotational speed has not reached the fuel supply start rotational speed, air running is continued. On the contrary, if it is determined ("Yes") that the engine rotational speed has reached the fuel supply start rotational speed; at Step S32, the control device 38 drives the respective injectors 18 to inject fuel into the cylinder units 13 (combustion chamber) of the diesel engine body 11.

Further, operation timing of the control device of the internal combustion engine of the fourth embodiment will be described. As illustrated in FIG. 1 and FIG. 9, when the motoring starting preparation signal 101 is output at a time t31, the second power converting unit 36 converts three phase alternating current power from the inboard power system 37 to direct current power and stores the direct current power into the power storage unit 35, and thereby, precharging is started and the DC bus voltage of the power storage unit 35 is increased. Further, when this is done, the relief valve 46 is opened. When the DC bus voltage in the power storage unit 35 becomes the standby voltage at a time t32, the DC bus voltage of the power storage unit 35 is maintained at the standby voltage. In the state where the DC bus voltage of the power storage unit 35 is maintained at the standby voltage, input of the engine rotation start-up signal 102 is waited for.

When the engine rotation start-up signal 102 is input at a time t33, the first power converting unit 34 converts the direct current power in the power storage unit 35 to alternating current power and drives the motor generator 32, and thereby, the turbine turbine rotational speed is increased. When this is done, the non-illustrated exhaust valves of the cylinder units 13 are shut, but the relief valve 28 is open, and thereby, a part of the combustion gas flowing through the intake pipe L1 is discharged, and surging is prevented from occurring. When the turbine rotational speed reaches the engine rotation start-up rotational speed at a time t34, air running, in which opening the on-off valves 26 and stopping the opening are repeated, is executed, and thereby, the engine rotational speed is increased. When this is done, by the discharge of the actuation gas supplied to the cylinder units 13 through air running and the combustion gas pressure-fed by the compressor 21, the turbine 22 is rotated, and thus the turbine rotational speed is also increased. At a time t35, when air running has started, the relief valve 28 is shut. Further, when the engine rotational speed reaches the fuel supply start rotational speed at a time t36, the injectors 18 are driven and the injectors 18 inject fuel into the cylinder units 13.

As described above, according to the control device of the internal combustion engine of the fourth embodiment, the control device 38 opens the relief valve 28 as the motoring starting preparation signal 101 is input, when the control device 38 causes the motor generator 32 to rotate the turbocharger 12 before starting the diesel engine body 11. Therefore, the combustion gas is able to be discharged outside, surging is able to be prevented from occurring, and as a result, controllability of the internal combustion engine is able to be improved.

According to the control device of the internal combustion engine of the fourth embodiment: when the motoring starting preparation signal 101 is input, the three phase alternating current power from the inboard power system 37 is converted to direct current power, the direct current power is stored into the power storage unit 35, and the direct current power therein is maintained at the standby voltage; and when the engine rotation start-up signal 102 is input, the direct current power in the power storage unit 35 is converted to alternating current power and driving of the motor generator 32 is started. Thereafter, when power from the inboard power system 37 is output to the motor generator 32, the turbine rotational speed is increased, and the turbine rotational speed reaches the engine rotation start-up rotational speed; the engine rotational speed is increased by repetition of opening of the on-off valves 26 and stopping of the opening and supply of the actuation gas to the cylinder units 13; and when the engine rotational speed reaches the fuel supply start rotational speed, the respective injectors 18 are driven and fuel is supplied to the cylinder units 13. Therefore, the standby state for the engine rotation start-up signal 102 is reached in the state where the power for driving the turbocharger 12 has been stored in the power storage unit 35, and when this engine rotation start-up signal 102 is input, the motor generator 32 is driven by the power in the power storage unit 35 and rotation of the turbocharger 12 is increased, and thus, the power in the power storage unit 35 is not consumed in the standby state, and power consumption is able to be reduced.

Further, the method of controlling the internal combustion engine of the fourth embodiment has: the process of receiving the motoring starting preparation signal 101 and starting power storage into the power storage unit 35; the process of receiving the motoring starting preparation signal 101 and opening the relief valve 28; the process of maintaining the voltage in the power storage unit 35 at the standby voltage; the process of receiving the engine rotation start-up signal 102, starting driving the motor generator 12 with the power in the power storage unit 35, outputting power from the inboard power system 37 to the motor generator 32, and driving the turbocharger 12; the process of supplying the combustion gas to the cylinder units 13 when the turbine rotational speed reaches the engine rotation start-up rotational speed; and the process of supplying the fuel to the cylinder units 13 when the engine rotational speed reaches the fuel supply start rotational speed.

Therefore, since the motor generator 32 is driven by the power in the power storage unit 35 and the turbine rotation is increased when the engine rotation start-up signal 102 is input, the power in the power storage unit 35 is not consumed in the standby state and power consumption is able to be reduced. Further, since the relief valve 28 is opened upon receipt of the motoring starting preparation signal 101, surging is able to be prevented from occurring, and as a result, controllability of the internal combustion engine is able to be improved.

Further, according to the above described embodiment, the turbocharger 12 serving as a turbocharger of the present invention is a hybrid turbocharger and an electric motor of the present invention is the motor generator 32, but the present invention is not limited to this configuration. For example, the motor generator 32 may simply be an electric motor (motor), and a battery, serving as a power storage unit, may be connected to this motor.

Further, in each of the above described embodiments, the engine rotation starting device 24 is formed of the actuation gas supply source 25, the on-off valves 26, and the actuation gas supply pipe L5, but the engine rotation starting device 24 is not limited to this configuration. For example, an internal combustion engine rotation starting device may be an electric motor, this electric motor may be connected to the crank shafts of the internal combustion engine, and the crank shafts may be forcibly driven and rotated by the electric motor.

REFERENCE SIGNS LIST

10 MARINE DIESEL ENGINE (INTERNAL COMBUSTION ENGINE)
11 DIESEL ENGINE BODY (INTERNAL COMBUSTION ENGINE BODY)
12 TURBOCHARGER (TURBOCHARGER)
13 CYLINDER UNIT
18 INJECTOR (FUEL SUPPLY DEVICE)
21 COMPRESSOR
22 TURBINE
24 INTERNAL COMBUSTION ENGINE ROTATION STARTING DEVICE
25 ACTUATION GAS SUPPLY SOURCE
26 ON-OFF VALVE
27 OPENING AND SHUTTING DEVICE
28 RELIEF VALVE
32 MOTOR GENERATOR (ELECTRIC MOTOR)
33 POWER CONVERTING DEVICE

34 FIRST POWER CONVERTING UNIT
35 POWER STORAGE UNIT
36 SECOND POWER CONVERTING UNIT
37 INBOARD POWER SYSTEM
38 CONTROL DEVICE
L1, L3 INTAKE PIPE
L2, L4 EXHAUST PIPE
L5 ACTUATION GAS SUPPLY PIPE
L6 RELEASE PIPE

The invention claimed is:

1. An internal combustion engine, comprising:
an internal combustion engine body;
a turbocharger including a compressor that is connected to the internal combustion engine body via a piping and supplies combustion gas to the internal combustion engine body, and a turbine that coaxially rotates with the compressor;
an electric motor that drives the compressor;
an opening and shutting device that opens and shuts between the piping and outside of the piping, the piping being provided between the internal combustion engine body and the compressor; and
a control device that drives and controls the electric motor and the opening and shutting device, wherein
the control device drives the compressor by driving the electric motor before start-up of the internal combustion engine body, brings the piping and the outside of the piping into an open state by driving the opening and shutting device at or before a time point at which a turbine rotational speed reaches a predetermined surging rotational speed, and start up the internal combustion engine body without suppling fuel when the turbine rotational speed reaches to a predetermined start-up rotational speed of the internal combustion engine body.

2. The internal combustion engine according to claim 1, further comprising:
a power storage unit that supplies power to the electric motor, wherein
the control device starts power storage into the power storage unit and brings the piping and the outside of the piping into the open state by driving the opening and shutting device.

3. The internal combustion engine according to claim 1, further comprising:
an internal combustion engine rotation starting device that starts starting of rotation of the internal combustion engine body without supplying fuel to the internal combustion engine body, wherein
the control device brings the piping and the outside of the piping into a shut state by driving the opening and shutting device after driving the internal combustion engine rotation starting device.

4. The internal combustion engine according to claim 1, wherein the control device brings the piping and the outside of the piping into a shut state by driving the opening and shutting device after an exhaust valve of the internal combustion engine body starts being driven to be opened and shut.

5. The internal combustion engine according to claim 2, wherein the opening and shutting device is a flow regulating valve, and the control device increases opening of the flow regulating valve at a predetermined change rate that has been set beforehand, when the opening and shutting device is driven.

6. A control device of an internal combustion engine, the control device comprising:
an internal combustion engine body;
a turbocharger including a compressor that is connected to the internal combustion engine body via a piping and supplies combustion gas to the internal combustion engine body and a turbine that coaxially rotates with the compressor;
an electric motor that drives the compressor;
an opening and shutting device that opens and shuts between the piping and outside of the piping, the piping being provided between the internal combustion engine body and the compressor; and
a control device that drives and controls the electric motor and the opening and shutting device, wherein
the control device drives the compressor by driving the electric motor before start-up of the internal combustion engine body, brings the piping and the outside of the piping into an open state by driving the opening and shutting device at or before a time point at which a turbine rotational speed reaches a predetermined surging rotational speed, and start up the internal combustion engine body without suppling fuel when the turbine rotational speed reaches to a predetermined start-up rotational speed of the internal combustion engine body.

7. A method of controlling an internal combustion engine, the method comprising:
starting power storage into a power storage unit;
driving a compressor by starting driving an electric motor with power in the power storage unit after voltage in the power storage unit reaches a predetermined standby voltage;
opening and shutting between a piping and outside of the piping, the piping being provided between an internal combustion engine body and the compressor, at or before a time point at which a turbine rotational speed reaches a predetermined surging rotational speed;
starting the internal combustion engine body without supplying fuel when the turbine rotational speed reaches a predetermined internal combustion engine start-up rotational speed; and
supplying fuel to the internal combustion engine when a rotational speed of the internal combustion engine body reaches a predetermined fuel supply start rotational speed.

8. An internal combustion engine, comprising:
an internal combustion engine body;
a compressor that is connected to the internal combustion engine body via a piping and supplies combustion gas to the internal combustion engine body;
an electric motor that drives the compressor;
an opening and shutting device that opens and shuts between the piping and outside of the piping, the piping being provided between the internal combustion engine body and the compressor; and
a control device that drives and controls the electric motor and the opening and shutting device, wherein
the control device drives the compressor by driving the electric motor before start-up of the internal combustion engine body, brings the piping and the outside of the piping into an open state by driving the opening and shutting device at or before a time point at which a turbine rotational speed reaches a predetermined surging rotational speed, and start up the internal combustion engine body without suppling fuel when the turbine rotational speed reaches to a predetermined start-up rotational speed of the internal combustion engine body.

9. A control device of an internal combustion engine, comprising:
an internal combustion engine body;
a compressor that is connected to the internal combustion engine body via a piping and supplies combustion gas to the internal combustion engine body;
an electric motor that drives the compressor;
an opening and shutting device that opens and shuts between the piping and outside of the piping, the piping being provided between the internal combustion engine body and the compressor; and
a control device that drives and controls the electric motor and the opening and shutting device, wherein
the control device drives the compressor by driving the electric motor before start-up of the internal combustion engine body, brings the piping and the outside of the piping into an open state by driving the opening and shutting device at or before a time point at which a turbine rotational speed reaches a predetermined surging rotational speed, and start up the internal combustion engine body without suppling fuel when the turbine rotational speed reaches to a predetermined start-up rotational speed of the internal combustion engine body.

10. A method of controlling an internal combustion engine, the method comprising:
driving a compressor by starting driving an electric motor;
opening and shutting between a piping and outside of the piping, the piping being provided between an internal combustion engine body and the compressor, at or before a time point at which a turbine rotational speed reaches a predetermined surging rotational speed;
starting the internal combustion engine body without supplying fuel when a turbine rotational speed reaches a predetermined internal combustion engine start-up rotational speed.

* * * * *